US012621171B2

(12) United States Patent
Martins et al.

(10) Patent No.: US 12,621,171 B2
(45) Date of Patent: May 5, 2026

(54) SECURE COMMUNICATIONS AND AUTHENTICITY VALIDATION OF A THIRD-PARTY DEVICE

(71) Applicant: Sword Health, S.A., Oporto (PT)

(72) Inventors: Pedro Miguel Simões Bastos Martins, Oporto (PT); José Carlos Coelho Alves, Oporto (PT); Pedro Miguel Moreira de Sousa, Oporto (PT); Pedro Fillipe Xavier Rodrigues, Oporto (PT); Pedro Miguel Silvestre Machado, Oporto (PT); Márcio Filipe Moutinho Colunas, Oporto (PT); Virgílio António Ferro Bento, Oporto (PT)

(73) Assignee: SWORD HEALTH, S.A., Oporto (PT)

( * ) Notice: Subject to any disclaimer, the term of this patent is extended or adjusted under 35 U.S.C. 154(b) by 210 days.

(21) Appl. No.: 18/518,064

(22) Filed: Nov. 22, 2023

(65) Prior Publication Data

US 2024/0179016 A1     May 30, 2024

(30) Foreign Application Priority Data

Nov. 25, 2022     (EP) ..................................... 22398026

(51) Int. Cl.
H04L 9/32 (2006.01)
(52) U.S. Cl.
CPC ................................... H04L 9/3271 (2013.01)
(58) Field of Classification Search
CPC .................................................... H04L 9/3271
(Continued)

(56) References Cited

U.S. PATENT DOCUMENTS 9,002,750 B1 * 4/2015 Chu ........................ H04W 12/04
                                                          705/72
9,438,579 B2 * 9/2016 Evans ..................... H04L 63/08
(Continued)

FOREIGN PATENT DOCUMENTS

EP          4376355          5/2024

OTHER PUBLICATIONS

"European Application Serial No. 23212023.8, Extended European Search Report mailed Feb. 14, 2024", 10 pgs.

*Primary Examiner* — Moeen Khan
(74) *Attorney, Agent, or Firm* — SCHWEGMAN LUNDBERG & WOESSNER, P.A.

(57) ABSTRACT

A motion tracker receives a data connection request from, or transmits the data connection request to, a computing device. The motion tracker generates a challenge according to a challenge-response authentication protocol. The challenge is at least partially associated with the data connection request or the computing device. The challenge is transmitted from the motion tracker to the computing device. The motion tracker receives a response to the challenge from the computing device. The response to the challenge is provided to the computing device by an authentication device communicatively coupled to the computing device. The motion tracker receives one or more instructions for execution by the motion tracker from the computing device. The motion tracker processes the response based on the challenge-response authentication protocol to determine that the response is authentic. The motion tracker executes the one or more instructions upon determining that the response is authentic.

20 Claims, 3 Drawing Sheets

(58) Field of Classification Search
USPC ......................................................... 713/168
See application file for complete search history.

(56) References Cited

U.S. PATENT DOCUMENTS

|  |  |  |  |  |
|---|---|---|---|---|
| 9,980,140 | B1 * | 5/2018 | Spencer | H04W 12/02 |
| 11,223,951 | B1 * | 1/2022 | Farmer | H04L 63/0442 |
| 2018/0331886 | A1 * | 11/2018 | Schroeder | H04L 69/40 |
| 2022/0070666 | A1 * | 3/2022 | Hua | H04L 9/3271 |

* cited by examiner

SECURE COMMUNICATIONS AND AUTHENTICITY VALIDATION OF A THIRD-PARTY DEVICE

CLAIM OF PRIORITY

This application claims the benefit of priority to European Patent Application No. 22398026.9, filed on Nov. 25, 2022, which is incorporated herein by reference in its entirety.

TECHNICAL FIELD

The present disclosure relates to the field of secure communications and authentication of devices. Examples described herein relate to the authentication of devices attempting to access a predetermined device, sometimes without having direct network access, and securing communications between the involved devices.

BACKGROUND

Many motion tracking systems that are adapted for the physical rehabilitation or recovery of patients include motion trackers that a person wears during physical therapy. Before a patient starts to use such a motion tracking system, and after the return of a motion tracking system by a patient that has already used it, the motion trackers may require some configuration or reconfiguration for them to be properly operative and in adequate condition for the person to use them.

Such configuration/reconfiguration may require software adjustments, and sometimes also hardware revisions and maintenance tasks. With respect to the software adjustments, one or more instructions are to be run on the motion tracker itself to achieve one or several objectives. The provision of the instructions can be a daunting task, even more so when multiple motion trackers are to be revised in this fashion, not to mention that depending on the circumstances, hundreds or even more motion trackers might have to be configured/reconfigured every now and then.

BRIEF DESCRIPTION OF THE DRAWINGS

To complete the description and in order to provide a better understanding of the disclosure, a set of drawings is provided. Said drawings form an integral part of the description and illustrate examples of the disclosure, which should not be interpreted as restricting the scope of the disclosure, but just as examples of how the disclosure can be carried out. The drawings comprise the following figures.

DETAILED DESCRIPTION

Figure 1:
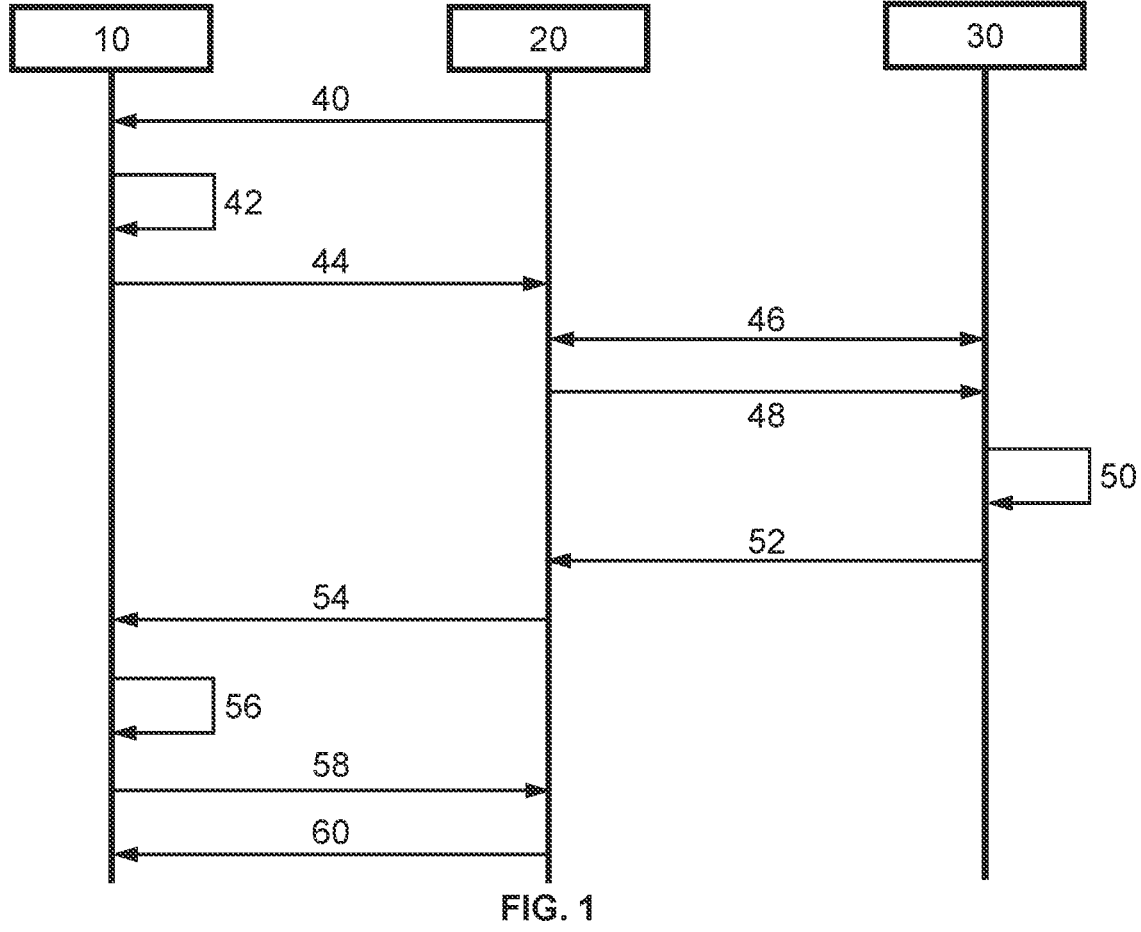
FIG. 1 is a diagram illustrating a method in accordance with some examples.

As mentioned, in the context of a motion tracking system used for physical rehabilitation or recovery of patients, the provision of instructions to one or more motion trackers can be a daunting task. Bulk configuration/reconfiguration can be a complex, time consuming process. Furthermore, the process may be prone to failure when motion trackers feature limited wireless communications capabilities, for example only Bluetooth, as there may be mutual interference caused by parallel communications. This problem may be exacerbated when the tasks are conducted in a relatively small or densely packed space like a warehouse.

Wired and wireless communications may provide means for supplying the instructions. However, in order not to create a security breach that could lead to the loading of deceptive data into the motion trackers, the motion trackers need to make sure that they communicate with a legitimate and trusted third-party device, otherwise refuse the data coming from the connected device.

Due to the limited connection means of motion trackers that do not enable them for, for example, downloading the instructions from a secure server on the cloud, or downloading data for authenticating third-party devices, it may be desirable or beneficial to perform authentication of third-party devices that are a priori not known to the motion tracker so that safe configuration/reconfiguration tasks may be carried out via the third-party devices. Examples described herein may provide for authentication of devices attempting to access a predetermined device, sometimes without having direct network access, and securing communications between the involved devices.

A first aspect relates to a method. The method may comprise receiving, by a motion tracker from a computing device, a data connection request or transmitting, by the motion tracker to the computing device, the data connection request, the motion tracker being configured to conduct a predetermined challenge-response authentication with an authentication device not communicatively coupled with the motion tracker. The method may include generating, by the motion tracker, a challenge according to the predetermined challenge-response authentication, the challenge being at least associated with the data connection request and/or the computing device of the data connection request.

The method may include transmitting, by the motion tracker to the computing device, the challenge. The method may further include receiving, by the motion tracker from the computing device, a response to the challenge, the response being a response to the challenge provided by the authentication device upon reception of the challenge from the computing device. The method may further include receiving, by the motion tracker from the computing device, one or more instructions for execution by the motion tracker;

The method may include processing, by the motion tracker, the response received from the computing device based on the predetermined challenge-response authentication to determine whether the challenge-response authentication is successful or unsuccessful. The method may further include running, by the motion tracker, the one or more instructions when the motion tracker has determined that the challenge-response authentication is successful and the computing device that the motion tracker has received the one or more instructions from is the same associated with the challenge, and not running the one or more instructions otherwise.

In some examples, the motion tracker gets to receive instructions for execution from other devices, such as the computing device, in a safe and reliable manner by first authenticating the device that is providing the instructions. The motion tracker is capable of conducting the authentication without prior knowledge of the identity of the computing device, yet the authentication is such that the computing device is to be trusted by the motion tracker whenever the authentication is successful thanks to the proper validation of the computing device by a trusted entity, particularly the authentication device. The authentication device may be related to the motion tracker by way of a predetermined challenge-response authentication procedure that the device and the tracker share.

In some examples, whenever a wired or wireless connection exists between the motion tracker and a computing device, either upon making the connection or afterwards, the motion tracker receives the data connection request from the computing device that wants to send data that includes instructions to the motion tracker. Alternatively, the motion tracker transmits the data connection request from the computing device to start on the motion tracker's end an authentication process that may eventually lead to a trusted data connection between the motion tracker and the computing device to receive instructions therefrom.

In some examples, the motion tracker registers the data connection request and may tie it to some identification data of the computing device, e.g., one or more identification codes thereof, thereby knowing from that point onwards that such computing device relates to that particular data connection. Should the motion tracker receive a data connection request from a different computing device through a wired or wireless connection, that other data connection request may likewise be identified with some identification data of the data connection request and/or of said different computing device so as to establish which device triggered which data connection request. When the motion tracker transmits the data connection request, the identification data of the computing device may be received therefrom subsequently to the transmission of the data connection request, or be a parameter of the wired/wireless connection between the two devices, e.g., a network or protocol address that identifies a party of the connection.

In some examples, since the computing device cannot be trusted by the motion tracker, at least initially, so is the data that the motion tracker may receive from the computing device unless proven trusted. The motion tracker may generate a new challenge that will be used to perhaps validate the computing device. That challenge may be provided to the computing device of the data connection request, and the challenge may be similarly tied to the computing device so that the motion tracker can identify later which computing device is successfully or unsuccessfully authenticated, and thanks to the link between the identification of the computing device and its data connection request, which data connection request to become trusted or untrusted.

In some examples, the computing device is then to turn to the authentication device that may provide data that might eventually authenticate the computing device at least in what respects the motion tracker, the latter being the device looking to ascertain whether the computing device is authorized to provide data, especially instructions, to the motion tracker. The computing device, which is communicatively coupled to the authentication device, for example via a wired or wireless communications link that may be over the Internet, is to provide the challenge thereto. In the event that the authentication device that receives the challenge is indeed associated with the motion tracker by way of the predetermined challenge-response authentication procedure, the response received by the computing device from the authentication device is the correct response to the challenge. If not, either no response is received, or the response to the challenge will not match or cooperate with the challenge according to the predetermined challenge-response authentication at the motion tracker.

In some examples, the motion tracker then receives said response to the challenge from the computing device and processes the response using the predetermined challenge-response authentication procedure at the tracker as aforesaid. Accordingly, the motion tracker may check if the challenge previously generated and the response corresponds to what is programmed in the authentication procedure. This could, for example, be that the response should have specific data, or that the challenge and response thereto cooperate in a certain way. If the checking conducted is correct, the computing device is deemed to be authorized for provision of instructions and thus it becomes authenticated. Accordingly, the one or more instructions that the motion tracker receives from the computing device are deemed to be legitimate and are to be executed by the motion tracker.

In some examples, software or program code of the predetermined challenge-response authentication procedure can be hardcoded into firmware or other software within the motion tracker and the authentication device, for instance during manufacturing of any of the devices, or be coded therein at a later stage, for instance during a device configuration stage. The authentication procedure software or program code may be transmitted to or retrieved by any of the devices and installed in a memory thereof as part of the configuration/reconfiguration of the devices.

To preclude or avoid possible authentication of computing devices by authentication devices different from a selected one or selected ones, the software or program code of the authentication procedure may have data that makes it unique for the authentication process by a given motion tracker. In some examples, this means that a particular, e.g., unique, set of data is provided at the motion tracker and the authentication device for the latter to identify the former whenever a challenge is to be processed and a response to it shall be given. The particular set of data may be tied to the hardware of the motion tracker, for instance but without limitation, it may include one or more identification codes associated with the hardware, or be introduced as part of the software itself. Such set of data, when provided to the authentication device as part of the data of the challenge, will identify the motion tracker that the challenge originates from in the event that the authentication device has that data, either already registered in a memory thereof or in a server that it has access to, and which will mean that the authentication device is indeed associated with the motion tracker for authentication of computing devices, so that the authentication device is capable of providing the response to the challenge based on the particularities of the predetermined challenge-response authentication procedure. The particular set of data may be encrypted by the motion tracker itself, and/or by the computing device upon reception of the data, and/or by the communication protocol used between each pair of devices.

Multiple authentication devices may have the particular set of data and the software or program code of the predetermined challenge-response authentication procedure of a same motion tracker. In that case, the motion tracker may benefit from the greater availability of authentication devices capable of performing the authentication function. In this regard, a plurality of authentication devices forming a system for the authentication of computing devices may be provided so that a computing device to be authenticated communicates with the system to get the response from an authentication device that is associated with the motion tracker via the authentication procedure.

In some examples, even if the computing device has no data enabling it to perform the authentication vis-à-vis the motion tracker and, hence, it must rely on the authentication device for its own authentication before the motion tracker, the computing device cannot achieve the authentication if unable to communicate with the authentication device. In this regard, for example but without limitation, the computing device must, first of all, be communicatively coupled with the authentication device, which means that there is a wired or wireless communications link between the two. For a wireless communications link to be in place, the computing device may have data for attempting to connect with the authentication device or a system including it, this being a first limitation for not all computing devices being capable of communicating with an authentication device or the right authentication device. Further, the authentication device or system including it may be configured to only accept connections from particular computing devices, for instance those having an Internet Protocol (IP) address or other type of address or an identification code within a predetermined whitelist or allowlist. Additionally or alternatively, the computing device may attempt communications with the authentication device with the right protocols and/or data packets and/or encryption layers, all of which being a kind of information that might not be in the possession of an unauthorized third party having computing devices that intend to supply deceptive data to the motion tracker.

In some examples, in the event that an unauthorized computing device gains access to a response to a challenge that is correct for that challenge, for instance by sniffing communications between a computing device and an authentication device, or by accessing a memory of a device, that unauthorized computing device will not be able to communicate with the motion tracker anyway. As aforesaid, the motion tracker keeps record of the data connection requests, the computing devices making the requests or to which the requests are made, and the challenges associated therewith, so the unauthorized computing device may supply the obtained response but it will be associated with a different challenge or with no challenge at all if no data connection request had been made by said device.

In some examples, following a successful authentication of the computing device, although the authentication is related to the computing device, the authentication is also linked to the data connection request. As data connections can come and go, the entire process may be repeated for a previously authenticated computing device in the event that the data connection has been lost or dropped at some point, in which case the computing device will have to get authenticated by the motion tracker again. This behavior may preclude the establishment of a trusted data connection with a computing device previously authenticated but that has been tampered with or impersonated by some other computing device during a period of time when the data connection was not maintained.

In some examples, the motion tracker comprises at least one, or a single, wireless communications module or modem. In some examples, the at least one, or the single, wireless communications module is not adapted for connection to a network such as the Internet. In some examples, the single wireless communications module is only adapted for a short-range communications protocol, e.g. for a distance of 1 km or less, and sometimes 100 m or less, e.g., Bluetooth.

In some examples, the motion tracker comprises at least one wired port adapted for data connections.

In some examples, the method further comprises, after determining that the challenge-response authentication is successful, establishing, by the motion tracker, a trusted data connection between the motion tracker and the computing device, the trusted data connection being associated with the data connection request. The challenge is further associated with the data connection request. Receiving the one or more instructions may comprise receiving the one or more instructions through the trusted data connection. The motion tracker may be configured to run instructions received through trusted data connections established by the motion tracker.

The data connection request may end up being an established trusted data connection over a wired or a wireless connection if the communication protocol between the motion tracker and the computing device is configured in that way, meaning that the motion tracker will disregard, e.g., not process, any data received from the computing device (other than data such as identification data for tying the data connection request to that device) until the trusted data connection is established. The computing device may wait until this happens to transmit the instructions, otherwise unnecessary bandwidth may be wasted with the transmission of data ignored by the motion tracker.

In some examples, the method further comprises, upon establishing the trusted data connection, transmitting, by the motion tracker to the computing device, one or more data packets indicative of establishment of the trusted data connection.

The motion tracker may inform the computing device about the establishment of the trusted data connection for the start of the transmission, by the computing device, of instructions that are to be processed by the tracker.

In some examples, the response and the one or more instructions are received by the motion tracker in one or more data packets. Further, running the one or more instructions may comprise running the one or more instructions of the one or more data packets when the response encoded in one or some of the one or more data packets has been determined by the motion tracker as being a successful challenge-response authentication.

The instructions from the computing device may be stored, for example, in a buffer of the motion tracker, for processing thereof subsequent to a successful authentication of the computing device, thereby speeding up the process of receiving and processing the instructions. Hence, the motion tracker may receive instructions from the computing device from the moment the data connection is requested, and even during or after the response to the challenge has been received by the motion tracker but not yet processed for the authentication, or not, of the computing device. Upon successful authentication, the motion tracker may be capable of taking the stored instructions and processing them, but only those tied to the computing device now authenticated.

In some examples, the method further comprises transmitting, by the computing device to the authentication device, the challenge generated by the motion tracker, and receiving, by the computing device from the authentication device, the response provided by the authentication device.

In some examples, the method further comprises transmitting, by the computing device to the authentication device, one or more first data packets comprising data for authentication of the computing device at the authentication device, and receiving, by the computing device from the authentication device, one or more second data packets comprising data indicative of successful or unsuccessful authentication of the computing device at the authentication device. Further, the computing device may transmit the challenge generated by the motion tracker to the authentication device when the data of the one or more second data packets is indicative of successful authentication.

The authentication device may require authentication of the computing device before accepting and/or processing any challenge therefrom that the authentication device is expected to give a response to. To this end, authentication signaling may be exchanged by the computing device and the authentication device. In the event that the computing device gets successfully authenticated, which may be dependent on any criterion or criteria known in the art that want to be established, a challenge already sent or subsequently sent to the authentication device may then be processed by said device and generate, if possible, a response to and transmit the response to the computing device.

In some examples, the response might not be provided if the authentication device cannot relate the challenge to any motion tracker in the data that the authentication device stores or has access to. Namely, if the particular set of data included together with the challenge does not find a matching or an associated particular set of data at the authentication device, the authentication device does not have sufficient information for the predetermined challenge-response authentication procedure. Therefore, no response is generated, or any response (but which will trigger an unsuccessful authentication at the motion tracker) is generated.

In some examples, the method further comprises, after determining that the challenge-response authentication is unsuccessful, starting, by the motion tracker, a timer associated with the computing device that made the data connection request, the timer having a predetermined duration. When the timer has been started and until the predetermined duration of the timer has not elapsed, the motion tracker neither generates any challenge associated with the computing device that started the motion tracker nor processes any response received from the computing device for determination of whether the challenge-response is successful or unsuccessful.

In some examples, the motion tracker protects itself from brute force attacks by unauthorized computing devices by forbidding the possible authentication of any computing device with incorrect response(s) to a challenge during a certain period of time.

In some examples, every time a new timer is started by the motion tracker associated with a predetermined computing device, the motion tracker increases the predetermined duration of the timer.

The cooldown time for resuming and reattempting the authentication of the computing device may be increased every time the computing device provides a response to a challenge that results in an unsuccessful authentication. This way, the motion tracker may protect itself even more from brute force attacks intended to achieve an authentication with responses not generated with the predetermined challenge-response authentication protocol.

In some examples, the motion tracker comprises a particular, e.g., unique, set of data associated with the predetermined challenge-response authentication.

In some examples, the challenge comprises a first payload comprising, at least in part, the particular set of data, and/or versioning data indicative of the predetermined challenge-response authentication used for the generation of the challenge, and/or data indicative of how encrypted data of the challenge, if any, has been encrypted. In some examples, the challenge comprises a second payload comprising pseudorandom data.

In some examples, the first payload includes data for the identification of the motion tracker, including versioning of the challenge in case the predetermined challenge-response authentication used by the motion tracker changes over time and, optionally, other data or metadata that the authentication device can use to solve the challenge. For example, some part of the first payload may be encrypted that the authentication device may have to decrypt prior to using it (e.g., the data for identification of the motion tracker or the versioning data), and the authentication device may use some data to identify which technique for decryption to use.

In some examples, the predetermined challenge-response authentication comprises asymmetric cryptography or zero-knowledge proof.

The authentication may rely on any one of the aforesaid techniques or other known in the art or, for example, other that may become available after the date of the present disclosure.

Different configurations with these techniques are possible. By way of example, for asymmetric cryptography, a public key as known in the art can be provided to the motion tracker and the private key to remain at the authentication device. The challenge may be hashed by the authentication device according to the characteristics of the predetermined challenge-response authentication, and then signed with the private key in the possession of the authentication device. The motion tracker likewise hashes its challenge and compares its hash with that of the response of the authentication device after decrypting it with the public key.

Many alternatives as known in the art are possible that also fall within the scope of the present disclosure.

In some examples, the one or more instructions comprise one or more of: software update, data reset, memory cleaning, quality control test (e.g., including functional tests such as, but without limitation, battery test, charging test, or measurement test), or new configuration setup.

In some examples, the method further comprises storing instructions for the predetermined challenge-response authentication to the motion tracker. In some examples, the method further comprises storing instructions for the predetermined challenge-response authentication to the authentication device.

In some examples, the method further comprises: finding, by the computing device, correspondence between data of a particular set of data received from the motion tracker and motion tracker identification data, the particular set of data being for identification of the motion tracker, and the motion tracker identification data comprising identification data of a plurality of predetermined motion trackers, and determining, by the computing device, that the motion tracker is legitimate when it has found the correspondence, and the computing device has received the response to the challenge from the authentication device.

In some examples, the computing device advantageously uses the data provided by the motion tracker and the authentication device to find out whether the motion tracker is legitimate and, thus, has not been tampered with or another device attempts to impersonate the motion tracker. To that end, the computing device may have stored in a memory thereof, or be capable of retrieving from, for example, a server, the motion tracker identification data that stores identification data of multiple motion trackers. The computing device compares the data of the particular set of data provided by the motion tracker (said data may for instance be sent together with the challenge for identification of the motion tracker by the authentication device and, thus, make possible or easier to provide a response to the challenge) with the motion tracker identification data to see if there is a match among the different motion trackers that the computing device has identification data of. When there is a match, and when the authentication device provides a response to the challenge transmitted thereto, which generally means that the authentication device has been capable of identifying the motion tracker and shares the predetermined challenge-response authentication, the motion tracker is regarded as being legitimate. By being legitimate, the computing device may process data or commands received from the motion tracker in a trusted manner, and not do so otherwise.

In some examples, the particular set of data comprises a digital fingerprint of software and/or hardware of the motion tracker. In some examples, the digital fingerprint is of the entire software and/or hardware of the motion tracker.

The digital fingerprints may be more difficult to forge by unauthorized parties gaining access to the motion tracker. So, for example, even if such a party accesses the motion tracker and introduces some code, the digital fingerprint that is to be expected by the authentication device and/or the computing device will not match due to the altered software that generates a different digital fingerprint.

A second aspect relates to a motion tracker. The motion tracker may comprise at least one inertial measurement unit, at least one wireless communications module and/or at least one port for wired data connection, at least one processor, and at least one memory. Further, the at least one memory may be configured, together with the at least one processor, to cause the motion tracker to carry out the steps of a method as described in the first aspect.

In some examples, the motion tracker receives a data connection request from a computing device or transmits the data connection request to the computing device, with the motion tracker being configured to conduct a predetermined challenge-response authentication with an authentication device not communicatively coupled with the motion tracker.

In some examples, the motion tracker generates a challenge according to the predetermined challenge-response authentication at least associated with the computing device of the data connection request.

In some examples, the motion tracker transmits the challenge to the computing device, and receive a response to the challenge from the computing device.

In some examples, the motion tracker receives instructions for execution by the motion tracker from the computing device.

In some examples, the motion tracker processes the response received from the computing device based on the predetermined challenge-response authentication to determine whether the challenge-response authentication is successful or unsuccessful, and runs the one or more instructions when the motion tracker has determined that the challenge-response authentication is successful and the computing device that the motion tracker has received the one or more instructions from is the same associated with the challenge, and does not run the one or more instructions otherwise.

A third aspect relates to a method. The method may comprise receiving, by a computing device from a motion tracker, a data connection request or transmitting, by the computing device to a motion tracker, the data connection request, the motion tracker being configured to conduct a predetermined challenge-response authentication with an authentication device not communicatively coupled with the motion tracker. The method may further comprise receiving, by the computing device from the motion tracker, a challenge according to the predetermined challenge-response authentication, the challenge being at least associated with the data connection request and/or the computing device of the data connection request.

The method may include transmitting, by the computing device to the authentication device, the challenge received from the motion tracker, and receiving, by the computing device from the authentication device, the response to the challenge provided by the authentication device. Further, the method may include at least one, being A) and/or B), of the two following sequences of steps:

A): finding, by the computing device, correspondence between data of a particular set of data received from the motion tracker and motion tracker identification data, the particular set of data being for identification of the motion tracker, and the motion tracker identification data comprising identification data of a plurality of predetermined motion trackers; and determining, by the computing device, that the motion tracker is legitimate when it has found the correspondence, and the computing device has received the response to the challenge from the authentication device;

B): transmitting, by the computing device to the motion tracker, the response to the challenge; and transmitting, by the computing device to the motion tracker, one or more instructions for execution by the motion tracker.

In some examples, the computing device uses the data provided by the motion tracker and the authentication device to find out whether the motion tracker is legitimate. When determined as being legitimate, the computing device trusts the motion tracker and responds to tracker's requests, if any, with higher priority (or decides to respond to them at all). At least during the periods of time when the computing device has not determined whether the motion tracker is legitimate or not, the computing device may respond to the motion tracker's requests depending on what they entail, e.g., running commands at the computing device, or providing data to the motion tracker. In some examples, the computing device in any event does relay challenges to the authentication device and responses to the challenges to the motion tracker at least while the motion tracker has not yet been determined as being legitimate.

In some examples, the particular set of data comprises a digital fingerprint of software and/or hardware of the motion tracker. In some examples, the digital fingerprint is of the entire software and/or hardware of the motion tracker.

A fourth aspect relates to a computing device. The computing device may comprise at least one data communications module, the at least one data communications module being for wired and/or wireless data communications. The computing device may further comprise at least one processor and at least one memory. Further, the at least one memory may be configured, together with the at least one processor, to cause the motion tracker to carry out the steps of a method as described in the third aspect.

A fifth aspect relates to a motion tracking system. The motion tracking system may comprise at least one motion tracker, for example but without limitation, as described in the second aspect. The motion tracking system may further comprise at least one computing device. Each computing device may include at least one data communications module configured to communicate with an authentication device and the at least one motion tracker, the at least one data communications module being for wired and/or wireless data communications. Each computing device may further include at least one processor and at least one memory configured, with the at least one processor of the same computing device, to cause the computing device to communicate with the at least one motion tracker for trusted transmission of one or more instructions to the at least one motion tracker for execution by the at least one tracker and/or for determining that the at least one motion tracker is legitimate.

In some examples, the motion tracking system further comprises the authentication device.

A sixth aspect relates to a data processing apparatus. The data processing apparatus may comprise means or modules for carrying out the steps of a method as described in the first aspect or the third aspect.

A seventh aspect relates to a computer program. The computer program may comprise instructions which, when the program is executed by at least one computing apparatus, such as a motion tracker or devices of a motion tracking system, cause the at least one computing apparatus to carry out the steps of a method as described in the first aspect or the third aspect.

An eighth aspect relates to a computer-readable non-transitory storage medium. The computer-readable non-transitory storage medium may comprise instructions which, when executed by at least one computing apparatus, such as a motion tracker or devices of a motion tracking system, cause the at least one computing apparatus to carry out the steps of a method as described in the first aspect or the third aspect.

A ninth aspect relates to a data carrier signal. The data carrier signal may carry a computer program as described in the seventh aspect.

FIG. 1 shows a method in accordance with some examples. The diagram of FIG. 1 illustrates a motion tracker 10, a computing device 20, and an authentication device 30.

The motion tracker 10, the computing device 20, and the authentication device 30 may be, but do not have to be, in the same premises. For example, the authentication device 30 could be in the premises, or be remote from any one or both of the motion tracker 10 and the computing device 20.

In some examples, the computing device 20 is a wireless electronic device such as a mobile phone or a tablet. In some examples, the computing device 20 is a personal computer, a digital signal processor, a microcontroller, etc.

In some examples, the authentication device 30 is a server. In some examples, the authentication device 30 is a personal computer, a digital signal processor, a microcontroller, or a wireless electronic device such as a mobile phone or a tablet.

In some examples, the motion tracker 10 is not communicatively coupled to the authentication device 30.

Referring to FIG. 1, the motion tracker 10 receives 40 a data connection request from the computing device 20 through a wired or a wireless connection between the two devices. The computing device 20 shares some identification data thereof with the motion tracker 10, thereby enabling the motion tracker 10 to keep track of what device is trying to connect with the motion tracker 10. The motion tracker 10 ties the data connection request to the computing device 20 by way of part or the totality of the identification data received, or any other identification data that the motion tracker 10 might generate based on the received data of the data connection request or identification data.

The motion tracker 10 generates 42 a challenge according to a predetermined challenge-response authentication already stored in the motion tracker 10. The motion tracker 10 ties the challenge generated 42 to the computing device 20 and/or the data connection request received 40 for ulterior identification of the computing device 20 or data connection request in case there is a successful authentication. The challenge generated could be, for example but without limitation, a hash, an encrypted message or other type of cryptographic challenge.

The motion tracker 10 transmits 44 the challenge via the wired or wireless connection, including some data of the motion tracker 10 that enables identification thereof when a response is to be provided, thereby making possible to have the same authentication data to provide responses to challenges of authentication procedures of many motion trackers, not just one. The data of the motion tracker 10 does not necessarily have to be transmitted at the same time the challenge is transmitted 44. It could be at different times.

The computing device 20 may then try to gather the response to the challenge received from the motion tracker 10. The computing device 20 is to establish at some point a data connection with the authentication device 30, either in wireless or in wired form. In some examples, like in the one illustrated in FIG. 1, an authentication 46 of the computing device 20 with respect to the authentication device 30 is first to be performed to let the authentication device 30 provide responses to challenges from requests of the specific computing device 20. Therefore, as long as the authentication device 30 does not authenticate computing device 20, the authentication device 30 will not accept challenges or at least provide responses to the computing device 20.

Although the authentication 46 is shown after the initial signaling 40, 44 between the motion tracker 10 and the computing device 20, it is to be noted that the authentication may be performed before or after the data connection request is made by the computing device 20 to the motion tracker 10.

During the authentication 46 signaling between the computing device 20 and the authentication device 30 through their established connection, the latter requests some credentials from the former. Once the computing device 20 supplies the credentials to the authentication device 30, the computing device 20 may then receive, from the authentication device 30, some indication of whether the credentials are correct, thereby authenticating the computing device 20 or not. When there is an unsuccessful authentication, the connection may be dropped, e.g., by the authentication device 30.

The computing device 20 transmits 48 the challenge to the authentication device 30, together with any piece of data received from the motion tracker 10 that identifies the latter.

The authentication device 30 attempts to generate 50 a response to the challenge received from the computing device 20 according to the predetermined challenge-response authentication already stored in the authentication device 30 and which is in some way shared with the motion tracker 10 for enabling authentication of computing devices like the computing device 20. If the authentication device 30 is the right one for the motion tracker 10, meaning that it indeed has a predetermined challenge-response authentication procedure that is common with the motion tracker 10, and the authentication device 30 has some previous data that identifies the motion tracker 10 so that the predetermined challenge-response authentication procedure is configured to perform authentication for that tracker 10, the response to the challenge is generated 50 and then transmitted 52 to the computing device 20.

The motion tracker 10 receives 54 the response to the challenge via the wired or wireless connection. The motion tracker 10 also receives, either at the same time that the response is received 54, or previously or subsequently to the reception 54 of the response, one or more instructions from the computing device 20.

The motion tracker 10 processes 56 the response to determine whether the challenge-response authentication is successful or unsuccessful.

Based on the outcome of the processing 56, the motion tracker 10 will then execute the instructions that may have received or could receive at a later stage from the computing device 20 or not. In this regard, in some examples, the motion tracker 10 transmits 58 an indication to the computing device 20 informing it about a successful authentication and/or a trusted data connection being established between the motion tracker 10 and the computing device 20. When that occurs, the motion tracker 10 may receive 60 instructions from the computing device 20 if the latter has waited for the successful authentication prior to transmitting instructions.

In the case of an unsuccessful authentication, in some examples the motion tracker 10 starts to keep track of the number of unsuccessful authentications concerning a given computing device 20. Based on said number of unsuccessful authentications, the motion tracker 10 may start, every time there is a new unsuccessful authentication, a cooldown timer for the computing device 20 during which the motion tracker 10 will not attempt to authenticate the computing device 20. The time of the timer may be made dependent on the number of unsuccessful authentications, thereby increasing with every unsuccessful authentication, either linearly, exponentially, or with any other type of function.

Every time there is an unsuccessful connection, the motion tracker 10 may generate 42 a new challenge tied to the computing device 20 and/or its data connection request so as to block the possibility of the computing device 20 being authenticated by trying multiple responses to a same challenge. Further, every time the motion tracker 10 gets a data connection with a successfully authenticated computing device 20 disconnected, a subsequent data connection with the same computing device 20 may have to start the authentication process all over again.

Communications between the motion tracker 10 and the computing device 20 may be over a wired communications link or a wireless communications link. Communications between the computing device 20 and the authentication device 30 may likewise be over a wired communications link or a wireless communications link.

Figure 2:
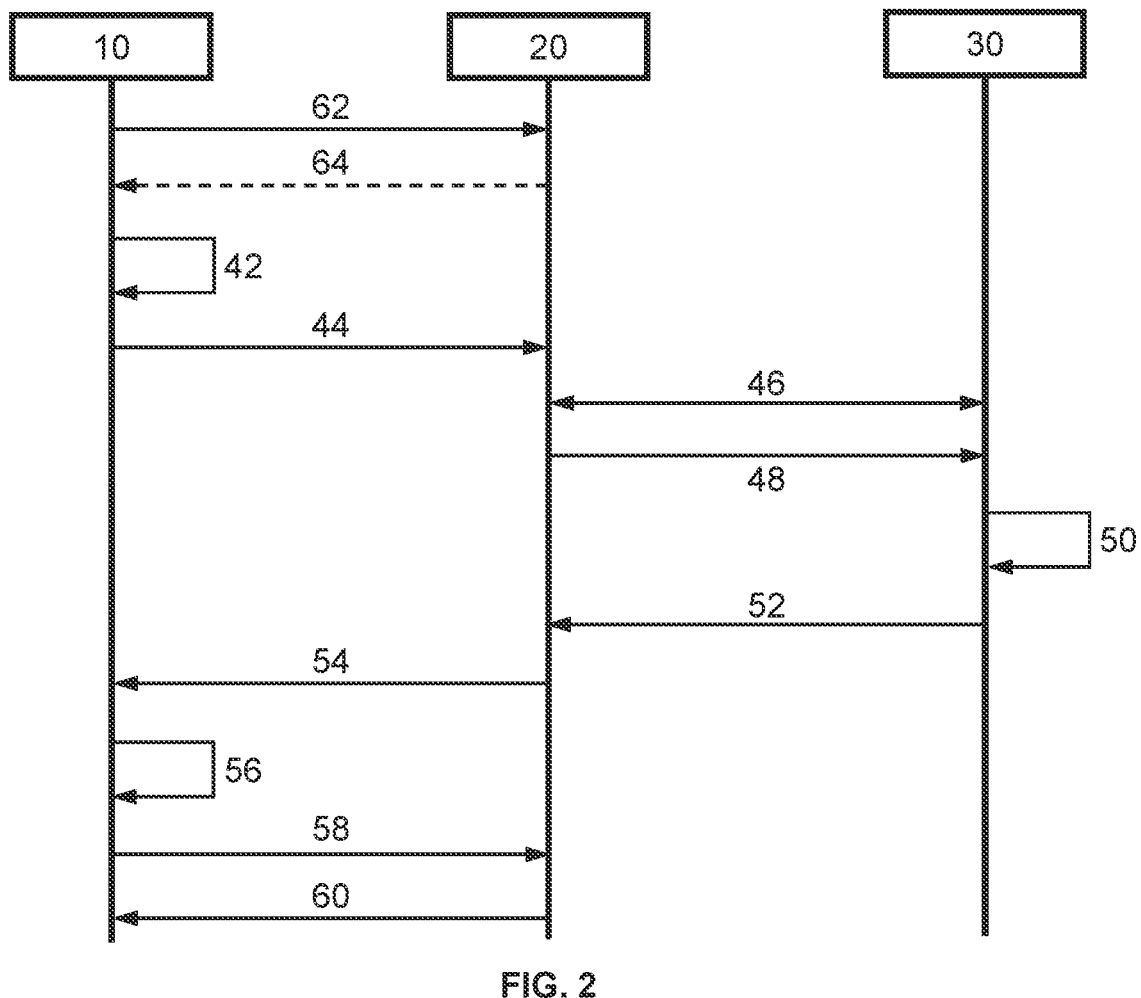
FIG. 2 is a diagram illustrating a method in accordance with some examples.

FIG. 2 shows a method in accordance with some examples.

The method of FIG. 2 is similar to that of FIG. 1, and also involves the motion tracker 10, the computing device 20, and the authentication device 30. The only difference between the two methods is that the motion tracker 10 transmits 62 a data connection request to the computing device 20, thus the motion tracker 10 is the device making and starting the data connection request, whereas in the examples of FIG. 1 it is the computing device 20 that is making and starting the data connection request.

In some cases, the motion tracker 10 receives 64 some data from the computing device 20 following the transmission 62 of the data connection request. The data can be used by the motion tracker 10 to tie the data connection request to the computing device 20 by way of at least some of the data received. The data may be for identification of the computing device 20. When no data is received 64, the data connection request can be tied to the computing device 20 by way of connection details that the motion tracker 10 has to make the transmission 62 of the data connection request.

Figures 3, 4, 5:
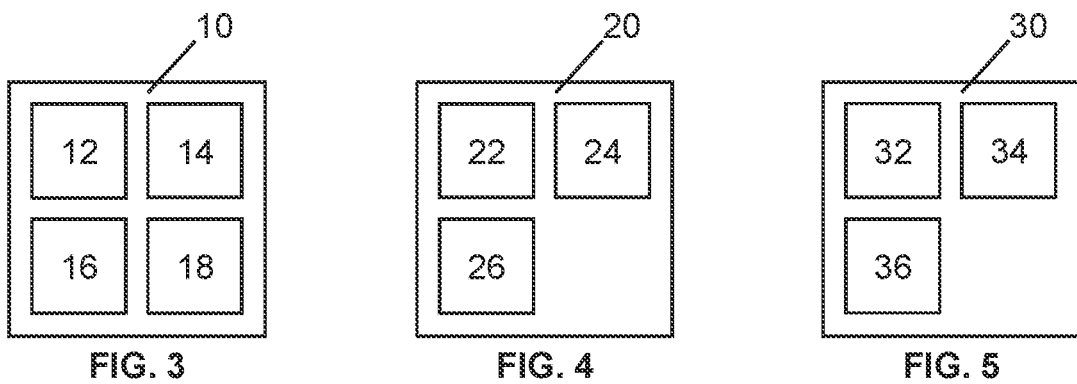
FIG. 3 is a block diagram of a motion tracker in accordance with some examples.
FIG. 4 is a block diagram of a computing device in accordance with some examples.
FIG. 5 is a block diagram of an authentication device in accordance with some examples.

FIG. 3 shows a motion tracker 10 in accordance with some examples.

The motion tracker 10 includes at least one processor 12, at least one memory 14, at least one wired and/or wireless data communications module 16, and at least one inertial measurement unit 18 that enables motion tracking of, for example, body members of a person wearing the motion tracker 10. The motion tracker 10 may include one or more devices for arrangement of the tracker 10 onto the body of the person.

The motion tracker 10 may be part of motion tracking system that is adapted for the physical rehabilitation or recovery of a patient. The motion tracker 10 may be worn by the patient during physical therapy (e.g., digital physical therapy). The motion tracker 10 may be one of a plurality of motion trackers in the motion tracking system.

The at least one memory 14 may store instructions, e.g., a computer program, that enable the at least one processor 12 to conduct tasks such as authentication of a computing device, maintaining secure communications with it, and eventually executing instructions received from the computing device if authenticated.

In some examples including but not limited to those examples in which the at least one data connection module 16 includes a wired data connection module, the motion tracker 10 comprises at least one port that may be for data connections. In some examples, the at least one port doubles for other tasks, such as for charging of, for example, at least one battery of the motion tracker 10. The port(s) may be, for example, Universal Serial Bus (USB) ports, but it could be any other type of ports, including non-standard ports.

FIG. 4 shows a computing device 20 in accordance with some examples.

The computing device 20 includes at least one processor 22, at least one memory 24, and one or more data communications module 26, which may be for wired communications and/or for wireless communications.

The at least one memory 24 may store instructions, e.g., a computer program, that enable the at least one processor 22 to conduct tasks such as providing instructions for execution to motion trackers, relaying challenges and responses between motion trackers and authentication devices, and/or checking whether a motion tracker is legitimate.

The computing device 20 may be part of motion tracking system that is adapted for the physical rehabilitation or recovery of a patient. The computing device 20 may communicate with the motion tracker 10 worn by the patient during physical therapy (e.g., to obtain measurements taken by the inertial measurement unit 18 of the motion tracker 10). In some examples, the computing device 20 provides a user interface that provides the patient with, for example, instructions with respect to movements or exercises to be performed in the context of the physical therapy.

FIG. 5 shows an authentication device 30 in accordance with some examples.

The authentication device 30 includes at least one processor 32, at least one memory 34, and one or more data communications module 36, which may be for wired communications and/or for wireless communications.

The at least one memory 34 may store instructions, e.g., a computer program, that enable the at least one processor 32 of the authentication device 30 to conduct tasks such as authentication of a computing device 20, maintaining secure communications with it, and providing responses to challenges based on a predetermined challenge-response authentication procedure.

Figure 6:
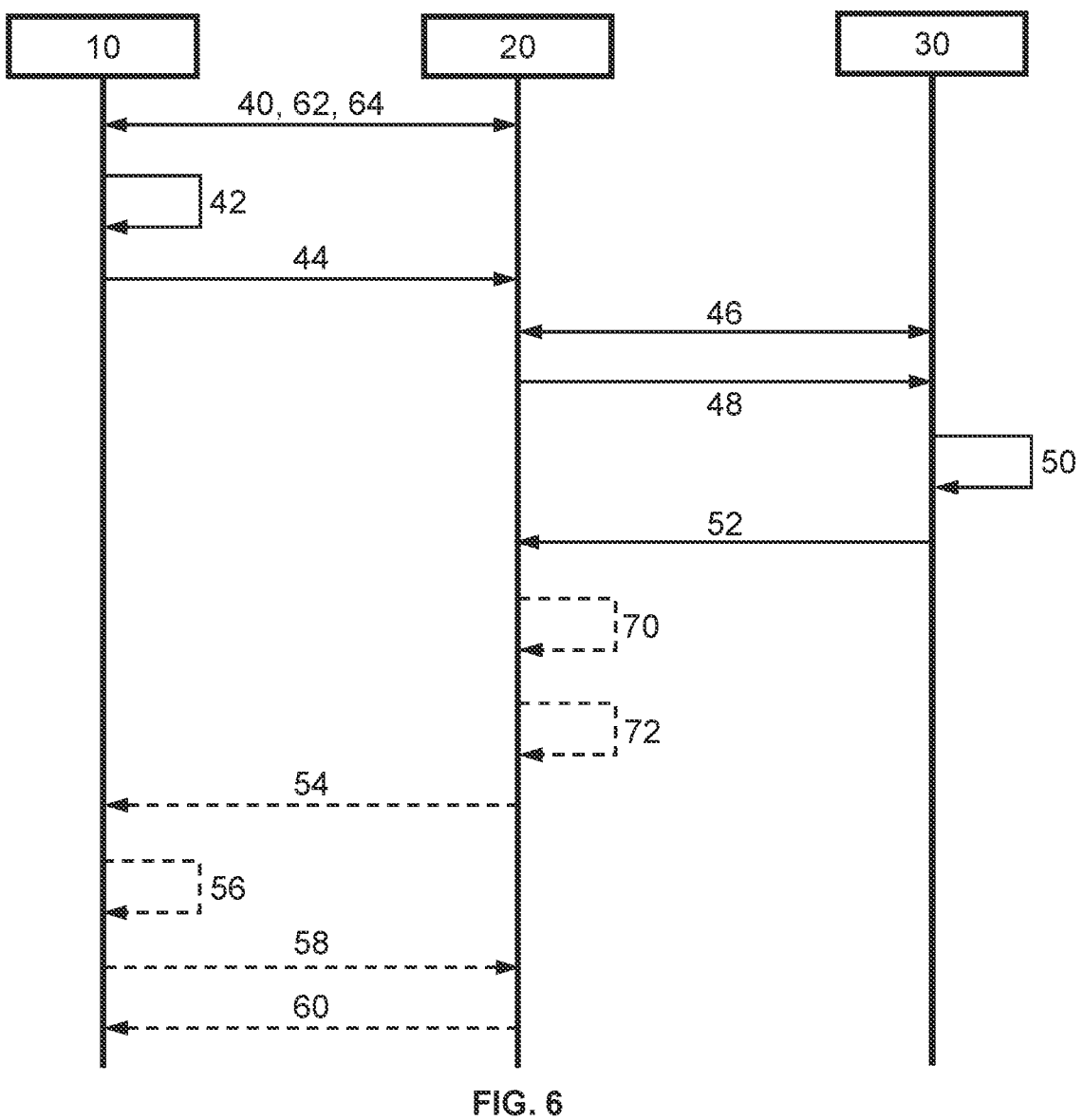
FIG. 6 is a diagram illustrating a method in accordance with some examples.

FIG. 6 shows a method in accordance with some examples. The diagram of FIG. 1 illustrates the motion tracker 10, the computing device 20, and the authentication device 30.

Part of the method of FIG. 6 is like any of the methods described in relation to FIG. 1 and FIG. 2, with the initial data connection request being received or transmitted 40, 62, with optionally some identification data of the computing device 20 being received 64 at the motion tracker 10. The motion tracker 10 generates 42 and transmits 44 the challenge to the computing device 20, that the computing device 20 in turn transmits 48 to the authentication device 30, in some cases following an optional authentication 46 of the computing device 20 before the authentication device 30. The authentication device 30 generates 50 and transmits 52 a response to the challenge to the computing device 20.

The computing device 20 may process 70 a particular set of data received from the motion tracker 10, for instance when the challenge was transmitted 44 by the motion tracker 10, to attempt to match at least part of the data with motion tracker identification data of a plurality of predetermined motion trackers. Then, the computing device 20 may determine 72 whether the motion tracker 10 is legitimate, which is when the outcome of the processing 70 is positive, namely there has been a match, and a response to the challenge has been received 52 from the authentication device 30.

Additionally or alternatively, the computing device 20 may then transmit 54, 60 the response and instructions to the motion tracker 10. The motion tracker 10 processes 56 the response to determine whether the challenge-response authentication is successful or unsuccessful. Depending on the success of the authentication, the motion tracker 10 may transmit 58 the indication to the computing device 20 that there has been a successful authentication and/or a trusted data connection has been established between the motion tracker 10 and the computing device 20, and run any instructions received 60 from the computing device 20.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. As used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples may include a particular sequence of operations, the sequence may in some cases be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

When an ordinal number (such as "first", "second", "third" and so on) is used as an adjective before a term or expression, that ordinal number is used (unless expressly specified otherwise) merely to indicate a particular feature, such as to distinguish that particular feature from another feature that is described by the same term or expression or by a similar term or expression. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" does not indicate that either widget comes sequentially before or after any other in order or location; does not indicate that either widget occurs or acts before or after any other in time; and does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets and the mere usage of the ordinal number "second" before the term "widget" does not indicate that there must be a "first widget".

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method of authenticating communications, the method comprising: accessing, at a motion tracker, a data connection request, the data connection request being received from or transmitted to a computing device; generating, by the motion tracker, a challenge according to a challenge-response authentication protocol, wherein the challenge is at least partially associated with: (i) the data connection request or (ii) the computing device; transmitting the challenge from the motion tracker to the computing device; receiving, at the motion tracker, a response to the challenge from the computing device, the response to the challenge provided to the computing device by an authentication device communicatively coupled to the computing device; receiving one or more instructions for execution by the motion tracker from the computing device; processing, by the motion tracker, the response based on the challenge-response authentication protocol to determine that the response is authentic; and executing the one or more instructions upon determining that the response is authentic.

In Example 2, the subject matter of Example 1 includes, wherein the authentication device is not communicatively coupled to the motion tracker.

In Example 3, the subject matter of any of Examples 1-2 includes, after determining that the response is authentic, establishing a trusted data connection between the motion tracker and the computing device.

In Example 4, the subject matter of Example 3 includes, upon establishing the trusted data connection, transmitting one or more data packets indicative of establishment of the trusted data connection from the motion tracker to the computing device.

In Example 5, the subject matter of any of Examples 1~4 includes, transmitting, from the computing device to the authentication device, the challenge generated by the motion tracker; and receiving, by the computing device from the authentication device, the response provided by the authentication device.

In Example 6, the subject matter of Example 5 includes, transmitting one or more first data packets comprising data for authentication of the computing device to the authentication device; and receiving, at the computing device, one or more second data packets comprising data indicative of authentication or non-authentication of the computing device from the authentication device, wherein the computing device transmits the challenge generated by the motion tracker to the authentication device when the data of the one or more second data packets is indicative of authentication.

In Example 7, the subject matter of any of Examples 1-6 includes, the method further comprising: configuring the motion tracker such that, after determining that a given response is not authentic, the motion tracker starts a timer associated with a computing device associated with the given response, and does not generate any challenge associated with the computing device associated with the given response, and does not process any response received from the computing device associated with the given response for determination of whether the response is authentic, until the timer reaches a specified duration.

In Example 8, the subject matter of Example 7 includes, wherein the specified duration of the timer is increased based at least in part on determination that successive responses by the computing device associated with the given response are not authentic.

In Example 9, the subject matter of any of Examples 1-8 includes, wherein the motion tracker comprises a set of data associated with the challenge-response authentication protocol.

In Example 10, the subject matter of Example 9 includes, wherein the challenge comprises a first payload and a second payload, the first payload comprises the set of data associated with the challenge-response authentication protocol, and the second payload comprises pseudo-random data.

In Example 11, the subject matter of any of Examples 1-10 includes, wherein the challenge-response authentication protocol comprises at least one of asymmetric cryptography or zero-knowledge proof cryptography.

In Example 12, the subject matter of any of Examples 1-11 includes, receiving, at the computing device, identification data from the motion tracker; and identifying a correspondence between the identification data and data identifying a plurality of known devices.

In Example 13, the subject matter of Example 12 includes, wherein the computing device determines that the motion tracker is legitimate based on: (I) receiving the response from the authentication device; and (II) the identification data which corresponds to a known device of the plurality of known devices.

In Example 14, the subject matter of Example 13 includes, wherein the identification data comprises a digital fingerprint of: software of the motion tracker or hardware of the motion tracker.

In Example 15, the subject matter of any of Examples 1-14 includes, wherein the response and the one or more instructions are received by the motion tracker in one or more data packets.

In Example 16, the subject matter of any of Examples 1-15 includes, wherein the motion tracker and the computing device form part of a motion tracking system.

In Example 17, the subject matter of Example 16 includes, wherein the authentication device forms part of the motion tracking system.

Example 18 is a motion tracker comprising: at least one inertial measurement unit; at least one wireless communications module or at least one port for wired data connection; at least one processor; and at least one memory, wherein the at least one memory is configured, together with the at least one processor, to cause the motion tracker to perform operations comprising: accessing a data connection request, the data connection request being received from or transmitted to a computing device; generating a challenge according to a challenge-response authentication protocol, wherein the challenge is at least partially associated with: (i) the data connection request or (ii) the computing device; transmitting the challenge from the motion tracker to the computing device; receiving a response to the challenge from the computing device, the response to the challenge provided to the computing device by an authentication device communicatively coupled to the computing device; receiving one or more instructions for execution by the motion tracker from the computing device; processing the response based on the challenge-response authentication protocol to determine that the response is authentic; and executing the one or more instructions upon determining that the response is authentic.

Example 19 is a motion tracking system comprising one or more motion trackers and a computing device, each of the one or more motion trackers being configured to perform operations comprising: accessing a data connection request, the data connection request being received from or transmitted to the computing device; generating a challenge according to a challenge-response authentication protocol, wherein the challenge is at least partially associated with: (i) the data connection request or (ii) the computing device; transmitting the challenge from the motion tracker to the computing device; receiving a response to the challenge from the computing device, the response to the challenge provided to the computing device by an authentication device communicatively coupled to the computing device; receiving one or more instructions for execution by the motion tracker from the computing device; processing the response based on the challenge-response authentication protocol to determine that the response is authentic; and executing the one or more instructions upon determining that the response is authentic.

In Example 20, the subject matter of Example 19 includes, the authentication device.

Example 21 is at least one machine-readable medium including instructions that, when executed by processing circuitry, cause the processing circuitry to perform operations to implement any of Examples 1-20.

Example 22 is an apparatus comprising means to implement of any of Examples 1-20.

Example 23 is a system to implement any of Examples 1-20.

Example 24 is a method to implement any of Examples 1-20.

The invention claimed is:

1. A method of authenticating communications, the method comprising:

accessing, at a motion tracker, a data connection request, the data connection request being received from or transmitted to a computing device;

generating, by the motion tracker, a challenge according to a challenge-response authentication protocol, wherein the challenge is at least partially associated with: (i) the data connection request or (ii) the computing device;

transmitting the challenge from the motion tracker to the computing device;

transmitting one or more first data packets comprising data for authentication of the computing device to an authentication device;

receiving, at the computing device, one or more second data packets comprising data indicative of authentication or non-authentication of the computing device from the authentication device;

transmitting, from the computing device to the authentication device, the challenge generated by the motion tracker and identification data from the motion tracker, wherein the computing device transmits the challenge generated by the motion tracker to the authentication device when the data of the one or more second data packets is indicative of authentication;

receiving, by the computing device from the authentication device, a response to the challenge provided by the authentication device in response to a matching, by the authentication device, of the challenge and the identification data to a corresponding challenge and a corresponding identification that relates the challenge to the motion tracker;

receiving, at the motion tracker, the response to the challenge from the computing device, the response to the challenge provided to the computing device by the authentication device communicatively coupled to the computing device;

receiving one or more instructions for execution by the motion tracker from the computing device;

processing, by the motion tracker, the response based on the challenge-response authentication protocol to determine that the response is authentic; and executing the one or more instructions upon determining that the response is authentic.

2. The method of claim 1, wherein the authentication device is not communicatively coupled to the motion tracker.

3. The method of claim 1, further comprising, after determining that the response is authentic, establishing a trusted data connection between the motion tracker and the computing device.

4. The method of claim 3, further comprising, upon establishing the trusted data connection, transmitting one or more data packets indicative of establishment of the trusted data connection from the motion tracker to the computing device.

5. The method of claim 1, wherein the identification data from the motion tracker comprises versioning data indicative of the challenge-response authentication protocol associated with generation of the challenge.

6. The method of claim 1, wherein the challenge is transmitted using a wireless connection.

7. The method of claim 1, the method further comprising: configuring the motion tracker such that, after determining that a given response is not authentic, the motion tracker starts a timer associated with a computing device associated with the given response, and does not generate any challenge associated with the computing device associated with the given response, and does not process any response received from the computing device associated with the given response for determination of whether the response is authentic, until the timer reaches a specified duration.

8. The method of claim 7, wherein the specified duration of the timer is increased based at least in part on determination that successive responses by the computing device associated with the given response are not authentic.

9. The method of claim 1, wherein the motion tracker comprises a set of data associated with the challenge-response authentication protocol.

10. The method of claim 9, wherein the challenge comprises a first payload and a second payload, the first payload comprises the set of data associated with the challenge-response authentication protocol, and the second payload comprises pseudo-random data.

11. The method of claim 1, wherein the challenge-response authentication protocol comprises at least one of asymmetric cryptography or zero-knowledge proof cryptography.

12. The method of claim 1, further comprising:
receiving, at the computing device, the identification data from the motion tracker; and
identifying a correspondence between the identification data and data identifying a plurality of known devices.

13. The method of claim 12, wherein the computing device determines that the motion tracker is legitimate based on:
(I) receiving the response from the authentication device; and
(II) the identification data which corresponds to a known device of the plurality of known devices.

14. The method of claim 13, wherein the identification data comprises a digital fingerprint of:
software of the motion tracker or hardware of the motion tracker.

15. A motion tracker comprising:
at least one inertial measurement unit;
at least one wireless communications module or at least one port for wired data connection;
at least one processor; and
at least one memory,
wherein the at least one memory is configured, together with the at least one processor, to cause the motion tracker to perform operations comprising:
accessing a data connection request, the data connection request being received from or transmitted to a computing device;
generating a challenge according to a challenge-response authentication protocol, wherein the challenge is at least partially associated with: (i) the data connection request or (ii) the computing device;
transmitting the challenge from the motion tracker to the computing device;
causing the computing device to transmit one or more first data packets comprising data for authentication of the computing device to an authentication device;
causing the computing device to receive one or more second data packets comprising data indicative of authentication or non-authentication of the computing device from the authentication device;
causing the computing device to transmit, to the authentication device, the challenge generated by the motion tracker and identification data from the motion tracker, wherein the computing device transmits the challenge generated by the motion tracker to the authentication device when the data of the one or more second data packets is indicative of authentication;

causing the computing device to receive, from the authentication device, a response to the challenge provided by the authentication device in response to a matching, by the authentication device, of the challenge and the identification data to a corresponding challenge and a corresponding identification that relates the challenge to the motion tracker;

receiving the response to the challenge from the computing device, the response to the challenge provided to the computing device by the authentication device communicatively coupled to the computing device;

receiving one or more instructions for execution by the motion tracker from the computing device;

processing the response based on the challenge-response authentication protocol to determine that the response is authentic; and executing the one or more instructions upon determining that the response is authentic.

16. The motion tracker of claim 15, the operations further comprising, after determining that the response is authentic, establishing a trusted data connection between the motion tracker and the computing device.

17. A motion tracking system comprising a motion tracker and a computing device, the motion tracker comprising a processor and a memory and being configured to perform operations comprising:

accessing a data connection request, the data connection request being received from or transmitted to the computing device;

generating a challenge according to a challenge-response authentication protocol, wherein the challenge is at least partially associated with: (i) the data connection request or (ii) the computing device;

transmitting the challenge from the motion tracker to the computing device;

transmitting one or more first data packets comprising data for authentication of the computing device to an authentication device;

receiving, at the computing device, one or more second data packets comprising data indicative of authentication or non-authentication of the computing device from the authentication device;

causing the computing device to transmit, to the authentication device, the challenge generated by the motion tracker and identification data from the motion tracker, wherein the computing device transmits the challenge generated by the motion tracker to the authentication device when the data of the one or more second data packets is indicative of authentication;

causing the computing device to receive, from the authentication device, a response to the challenge provided by the authentication device in response to a matching, by the authentication device, of the challenge and the identification data to a corresponding challenge and a corresponding identification that relates the challenge to the motion tracker;

receiving the response to the challenge from the computing device, the response to the challenge provided to the computing device by the authentication device communicatively coupled to the computing device;

receiving one or more instructions for execution by the motion tracker from the computing device;

processing the response based on the challenge-response authentication protocol to determine that the response is authentic; and executing the one or more instructions upon determining that the response is authentic.

18. The motion tracking system of claim 17, further comprising the authentication device.

19. The motion tracking system of claim 17, wherein the authentication device is not communicatively coupled to the motion tracker.

20. The motion tracking system of claim 17, the operations further comprising, after determining that the response is authentic, establishing a trusted data connection between the motion tracker and the computing device.

\* \* \* \* \*